C. C. HARDMAN.
SINK OR THE LIKE.
APPLICATION FILED FEB. 3, 1909.
945,457.
Patented Jan. 4, 1910.
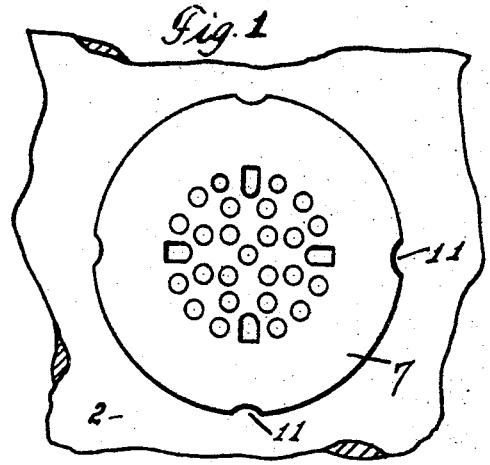
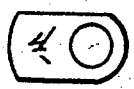
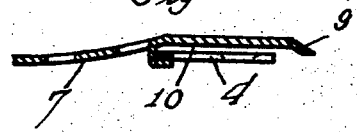
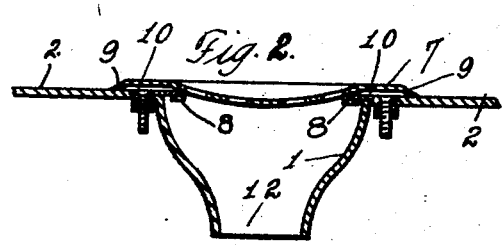
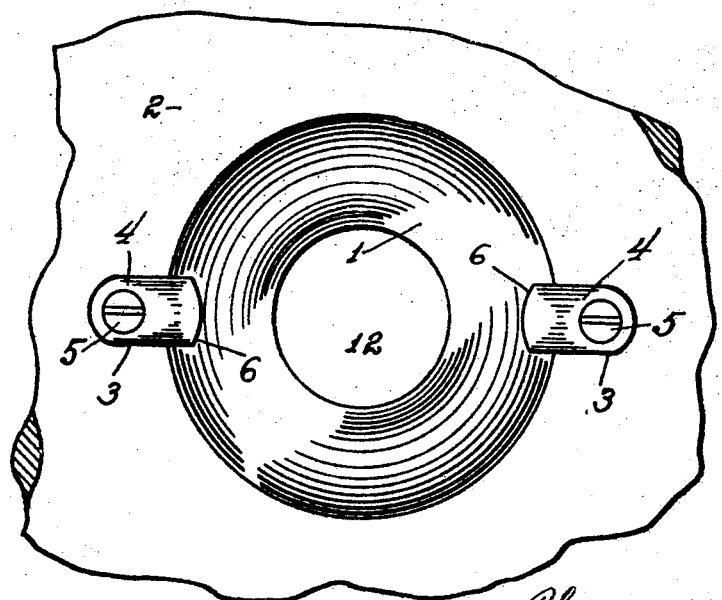
Witnesses
Fred A. Schlosser.
Linda M. Case.
Inventor
Charles C. Hardman
John H. Boss
His Attorney

UNITED STATES PATENT OFFICE.

CHARLES C. HARDMAN, OF MANSFIELD, OHIO, ASSIGNOR TO THE BARNES MANUFACTURING COMPANY, OF MANSFIELD, OHIO, A CORPORATION OF OHIO.

SINK OR THE LIKE.

945,457.  Specification of Letters Patent.  Patented Jan. 4, 1910.

Application filed February 3, 1909. Serial No. 475,938.

*To all whom it may concern:*

Be it known that I, CHARLES C. HARDMAN, a citizen of the United States of America, residing at Mansfield, in the county of Richland and State of Ohio, have invented certain new and useful Improvements in Sinks or the Like, of which the following is a specification.

My invention relates to a sink that is constructed with a bell or similar shape outlet. The upper surface of the bell portion of the sink is usually made with an annular groove or depression in the surface into which the strainer plate is fitted.

In the manufacture of sinks, the shoulder forming the depression is made heavier than the other parts of the sink thereby making it extremely difficult to enamel the surface on account of the difference in the contraction and expansion of the lighter and heavier parts of the castings or sink when it is heated.

One of the objects of my improvement is to construct a sink with a bell shape outlet having a flat surface thereby eliminating the shouldered and depressed portion of the ordinary sink which makes it possible to enamel the sink or other receptacle and practically obviate the danger of the enamel breaking, chipping or pealing off as the elimination of the shouldered portion of the sink leaves the metal of uniform thickness.

Another object of my invention is to provide in combination with the flat surface of the sink and bell shape outlet, a means of removably attaching the strainer plate of the outlet portion of the sink and means of draining the water from the sink through openings in the strainer plate.

In the drawings, Figure 1 represents a plan view of a portion of the bottom of a sink showing the strainer plate removably attached over the bell-shape opening. Fig. 2 is a cross section side elevation of the strainer plate, part of the sink bottom, clamping lugs and side view of the bell-shape outlet. Fig. 3 is a plan view of one of the clamping lugs. Fig. 4 is a side view of one of the clamping lugs and part of the strainer plate showing means of removably securing the strainer plates to the bottom of the sink. Fig. 5 is a plan view of the bell-shape outlet of the clamping lugs molded to the top surface of the sink.

In the drawings, reference numeral 1 represents a bell shape outlet made integral with a sink 2 having a flat or plane surface. Depressed portions 3 are formed in the bottom of the sink diametrically opposite each other and the clamping lugs 4 are inserted therein and retained in place by the bolts 5 leaving the free ends of said lugs extending over the opening of the outlet. The free ends 6 of the clamping lugs are rounded. The strainer plate 7 is provided with four depending lipped portions 8 which are arranged to be within the path of the free ends 6 of the clamping lugs when the strainer plate is placed over the bell shape outlet. When it is desired to attach the strainer plate 7 over the bell shape outlet, the strainer plate is rotated until the ends of the clamping lugs contact with and overlap the depending lipped portions 8 of the strainer plate as shown in Fig 4. The strainer plate is then securely but removably attached to the flat surface of the sink over the bell shape outlet. The strainer plate is also provided with a downwardly depending beveled portion 9 which contacts with the upper surface of the flat portion 2 of the sink or other receptacle forming an annular chamber 10 surrounding the bell shape outlet permitting the water in the sink to pass through the openings 11 formed in the strainer plate 7 and out through the opening 12 of the bell shape outlet.

It will be observed that the construction of a sink with a flat surface as shown in combination with a removable strainer plate provides a sink and strainer plate that has a flat or plate surface with all shouldered portions, depressions or cavities eliminated which form pockets into which dirt or other sediment can lodge making the sink unsanitary.

Having fully described my invention, what I claim and desire to secure by Letters Patent is:

1. In a flat bottom sink provided with a bell shape outlet, having a flat upper surface, a strainer plate provided with a beveled portion and depending lips, clamping lugs secured to the flat bottom of said sink and adapted to engage said lips, said lips being adapted to contact with the clamping lugs to securely but removably attach the strainer plate to the flat bottom of said sink.

2. In a flat bottom sink having a bell shaped outlet made integral therewith, a strainer plate provided with a beveled portion to form a chamber for draining purposes, depending lips also formed on said strainer plate, clamping lugs secured to the flat bottom of said sink and adapted to engage with lips whereby said strainer plate is securely but removably attached to the flat bottom of the sink.

In testimony whereof I affix my signature in presence of two witnesses.

CHARLES C. HARDMAN.

Witnesses:
    JOHN H. COOS,
    PEARL ACKERMAN.